United States Patent
Park et al.

(10) Patent No.: US 12,407,931 B2
(45) Date of Patent: Sep. 2, 2025

(54) ELECTRONIC DEVICE FOR IMPROVING IMAGE QUALITY, AND OPERATION METHOD OF SAME

(71) Applicant: Samsung Electronics Co., Ltd., Suwon-si (KR)

(72) Inventors: Jaehyoung Park, Suwon-si (KR); Woontahk Sung, Suwon-si (KR); Jaemu Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 18/454,538

(22) Filed: Aug. 23, 2023

(65) Prior Publication Data
US 2023/0396884 A1 Dec. 7, 2023

Related U.S. Application Data

(63) Continuation of application No. PCT/KR2022/004123, filed on Mar. 24, 2022.

(30) Foreign Application Priority Data

Mar. 29, 2021 (KR) .................. 10-2021-0040510

(51) Int. Cl.
*H04N 23/68* (2023.01)
*H04N 23/80* (2023.01)
(Continued)

(52) U.S. Cl.
CPC .......... *H04N 23/687* (2023.01); *H04N 23/80* (2023.01); *H04N 25/48* (2023.01); *H04N 23/951* (2023.01)

(58) Field of Classification Search
None
See application file for complete search history.

(56) References Cited

U.S. PATENT DOCUMENTS

| 6,429,895 B1 * | 8/2002 | Onuki ................. H04N 23/663 348/208.99 |
| 9,083,883 B2 | 7/2015 | Ogasahara |

(Continued)

FOREIGN PATENT DOCUMENTS

| GB | 2516918 A * | 2/2015 | ......... H04N 5/23258 |
| JP | 2000-013670 A | 1/2000 | |

(Continued)

OTHER PUBLICATIONS

International Search Report dated Jun. 30, 2022, issued in International Application No. PCT/KR2022/004123.

*Primary Examiner* — Paul M Berardesca
(74) *Attorney, Agent, or Firm* — Jefferson IP Law, LLP

(57) ABSTRACT

An electronic device is provided. The electronic device includes a camera module which can perform an optical image stabilization (OIS) function, and at least one processor electrically connected to the camera module. The at least one processor is configured to control the camera module to continuously acquire first image data including first pixel data, second image data including second pixel data, third image data including third pixel data, and fourth image data including fourth pixel data by using the OIS function, acquire fifth pixel data on the basis of the first pixel data, the second pixel data, the third pixel data, and the fourth pixel data, and generate a first image frame on the basis of the fifth pixel data.

20 Claims, 10 Drawing Sheets

(51) Int. Cl.
*H04N 23/951* (2023.01)
*H04N 25/48* (2023.01)

(56) References Cited

U.S. PATENT DOCUMENTS

| | | |
|---|---|---|
| 9,288,395 B2 | 3/2016 | Baer et al. |
| 9,426,362 B2 | 8/2016 | Tang et al. |
| 2007/0146382 A1 | 6/2007 | Miller |
| 2011/0115927 A1 | 5/2011 | Jang |
| 2012/0188387 A1 | 7/2012 | Ogasahara |
| 2014/0125825 A1 | 5/2014 | Baer et al. |
| 2015/0319363 A1 | 11/2015 | Furukawa |
| 2016/0358314 A1 | 12/2016 | Ji et al. |
| 2016/0373649 A1* | 12/2016 | Honda .................. H04N 23/54 |
| 2017/0244893 A1* | 8/2017 | Chien ...................... G03B 5/02 |
| 2019/0222812 A1 | 7/2019 | Cha et al. |
| 2020/0195843 A1 | 6/2020 | Kawawa et al. |
| 2021/0014416 A1* | 1/2021 | Kim ..................... G02B 27/644 |
| 2024/0334077 A1* | 10/2024 | Park ..................... H04N 23/687 |

FOREIGN PATENT DOCUMENTS

| | | | |
|---|---|---|---|
| JP | 2007-006038 A | | 1/2007 |
| JP | 2011061414 A | * | 3/2011 |
| JP | 2012-156778 A | | 8/2012 |
| JP | 2015-192199 A | | 11/2015 |
| JP | 2020-096301 A | | 6/2020 |
| KR | 10-0846797 B1 | | 7/2008 |
| KR | 10-2011-0055241 A | | 5/2011 |
| KR | 10-2016-0087684 A | | 7/2016 |
| KR | 10-2016-0142760 A | | 12/2016 |
| WO | 2020/033427 A1 | | 2/2020 |

\* cited by examiner

ELECTRONIC DEVICE FOR IMPROVING IMAGE QUALITY, AND OPERATION METHOD OF SAME

CROSS-REFERENCE TO RELATED APPLICATION(S)

This application is a continuation application, claiming priority under § 365(c), of an International application No. PCT/KR2022/004123, filed on Mar. 24, 2022, which is based on and claims the benefit of a Korean patent application number 10-2021-0040510, filed on Mar. 29, 2021, in the Korean Intellectual Property Office, the disclosure of which is incorporated by reference herein in its entirety.

BACKGROUND

1. Field

The disclosure relates to a technology for improving image quality when an image is captured by using a camera module.

2. Description of Related Art

As functions of mobile devices are diversified recently, a demand for improvement of an image capturing function using a mobile device is also increasing. Accordingly, there is a demand for a technology for improving quality of an image obtained through a mobile device.

An electronic device may include a camera module which is capable of performing an optical image stabilization (OIS) function. The electronic device may stabilize an image by shifting a lens assembly included in the camera module through the OIS function, or by shifting an image sensor. The OIS function may include a sensor shift method of shifting an image sensor, and a lens shift method of shifting a lens assembly. The electronic device capable of performing the OIS function may acquire a plurality of pieces of image data from the camera module in the middle of performing the OIS function.

The above information is presented as background information only to assist with an understanding of the disclosure. No determination has been made, and no assertion is made, as to whether any of the above might be applicable as prior art with regard to the disclosure.

SUMMARY

According to a related-art technology, there are limitations to improving a resolution of an image acquired through a camera module. For example, since there are limitations to a modulation transfer function (MTF) of a lens assembly or the number of pixels included in an image sensor, there may be a problem that it is difficult to improve a resolution of an image.

In addition, according to the related-art technology, there may be a problem that even image data obtained after shaking is partially compensated for while an OIS function is being performed by an electronic device includes an artifact such as a noise, a blur, a jagging artifact or the like.

Aspects of the disclosure are to address at least the above-mentioned problems and/or disadvantages and to provide at least the advantages described below. Accordingly, an aspect of the disclosure is to provide a technology for improving image quality when an image is captured by using a camera module.

Additional aspects will be set forth in part in the description which follows and, in part, will be apparent from the description, or may be learned by practice of the presented embodiments.

In accordance with an aspect of the disclosure, an electronic device is provided. The electronic device includes a camera module configured to perform an OIS function, and at least one processor electrically connected with the camera module. The at least one processor may control the camera module to continuously acquire first image data including first pixel data, second image data including second pixel data, third image data including third pixel data, and fourth image data including fourth pixel data by using the OIS function, may acquire fifth pixel data based on the first pixel data, the second pixel data, the third pixel data, and the fourth pixel data, and may generate a first image frame based on the fifth pixel data.

In accordance with another aspect of the disclosure, an operating method of an electronic device is provided. The operating method includes controlling a camera module included in the electronic device to continuously acquire first image data including first pixel data, second image data including second pixel data, third image data including third pixel data, and fourth image data including fourth pixel data by using an OIS function, acquiring fifth pixel data based on the first pixel data, the second pixel data, the third pixel data, and the fourth pixel data, and generating a first image frame based on the fifth pixel data.

According to various embodiments of the disclosure, the electronic device may acquire an image having an improved resolution. The electronic device may acquire an image having a higher solution than that of one piece of image data while performing the OIS function.

According to various embodiments of the disclosure, the electronic device may reduce artifacts included in image data. For example, the electronic device may acquire an image that has fewer artifacts than those of one piece of image acquired while performing the OIS function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
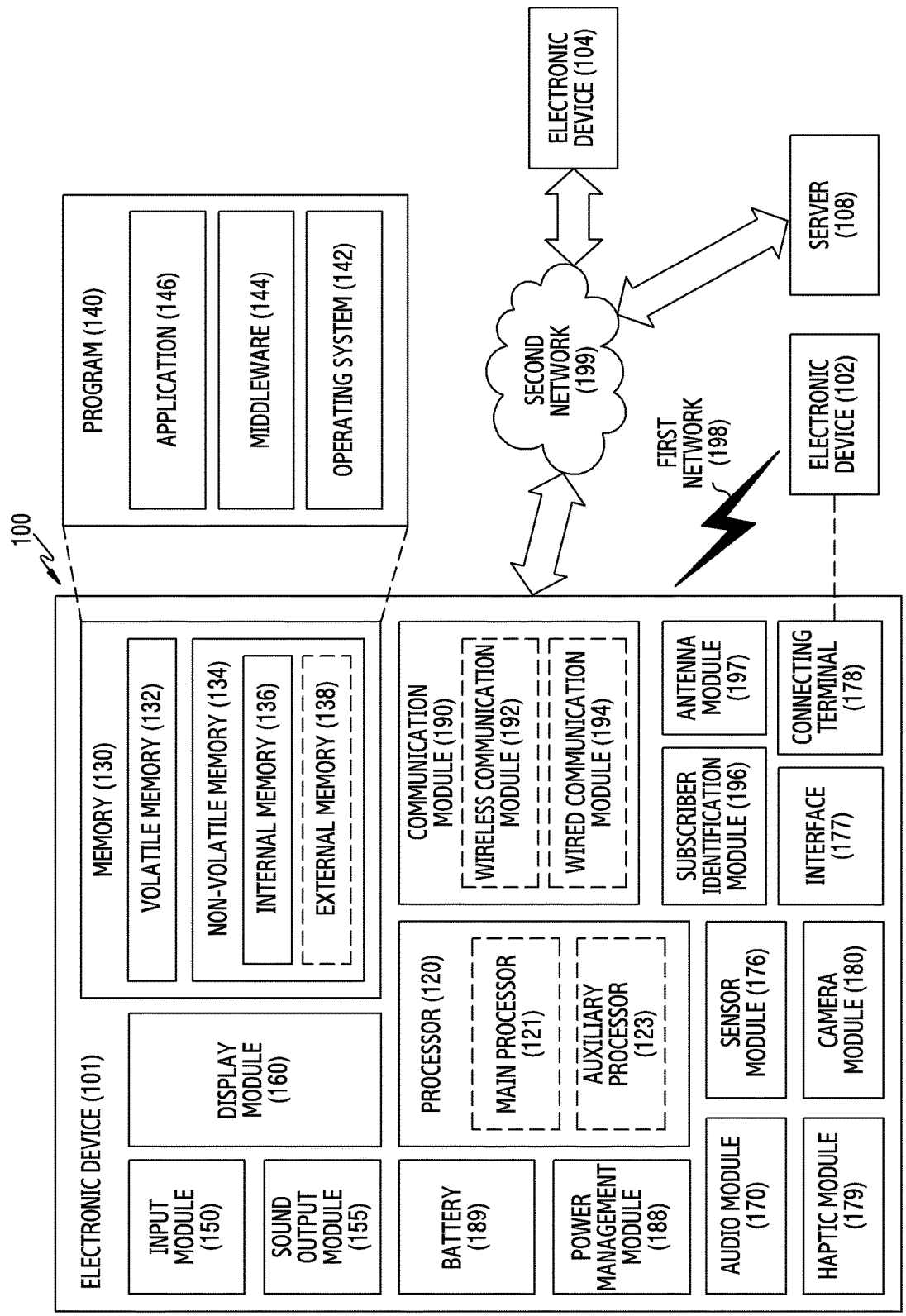
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
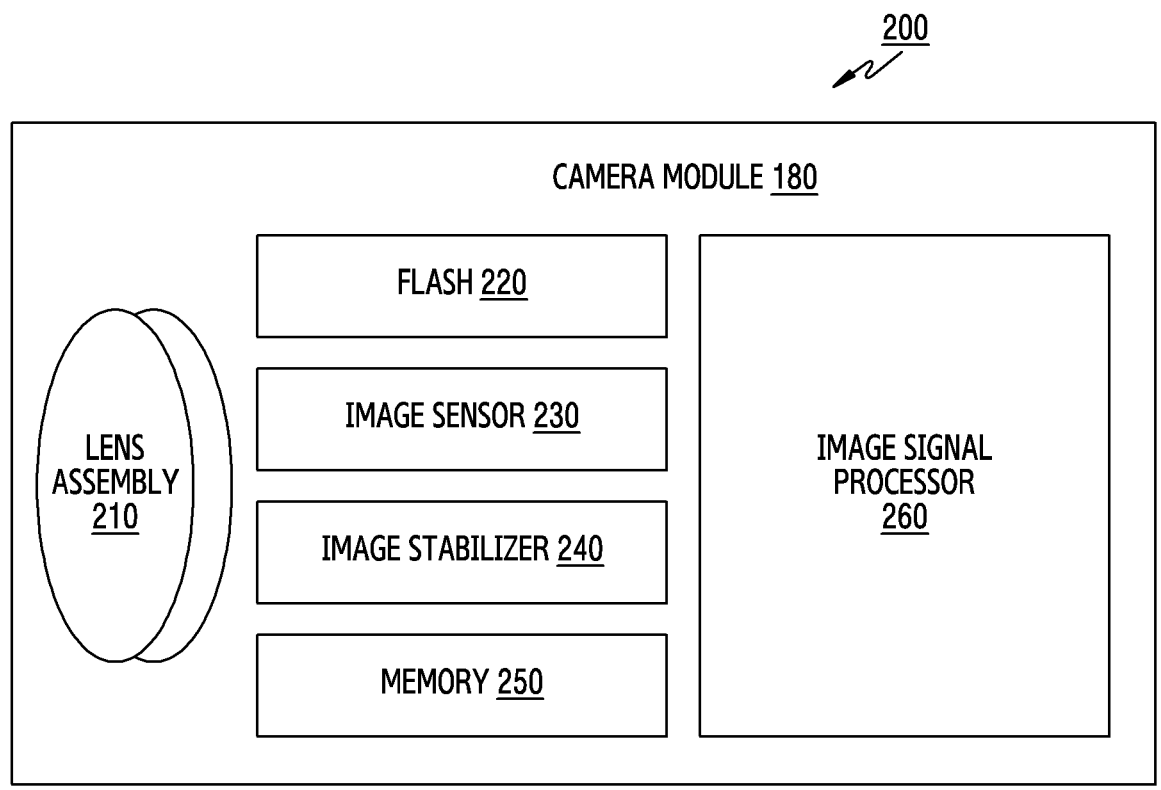
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
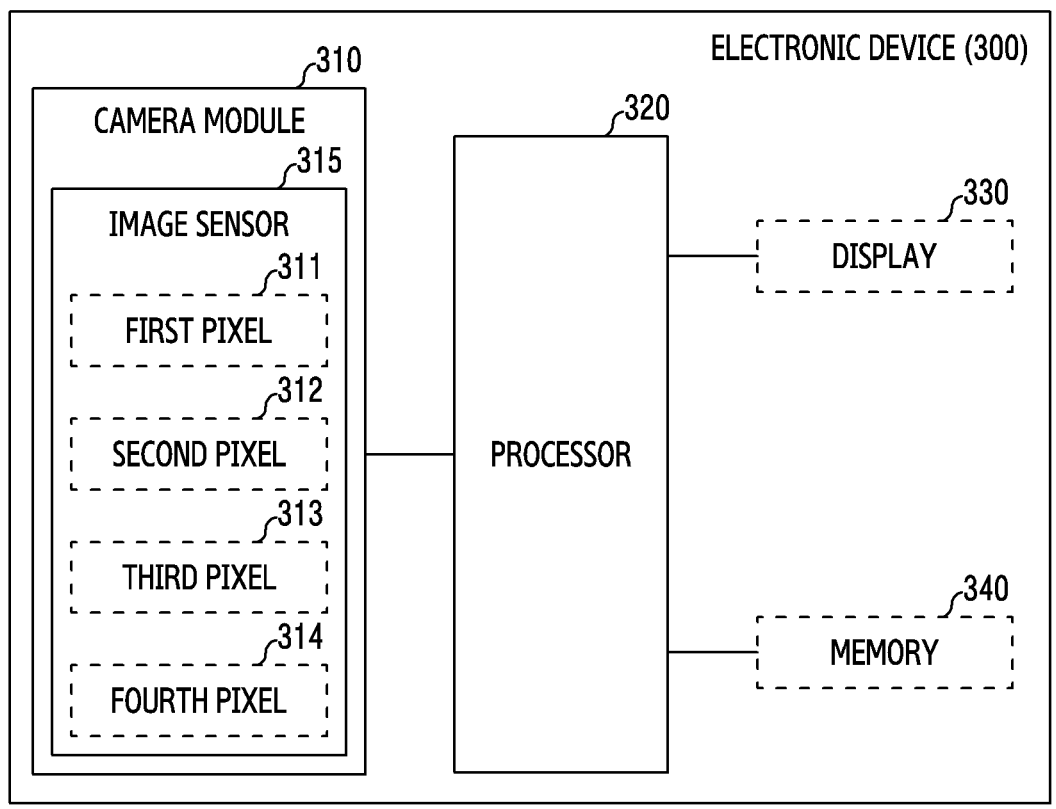
FIG. 3 is a block diagram illustrating a schematic configuration of an electronic device including a camera module according to an embodiment of the disclosure.

FIG. 3 is a block diagram illustrating a schematic configuration of an electronic device 300 which includes a camera module 310 according to an embodiment of the disclosure.

According to an embodiment, FIG. 3 illustrates schematic components included in the electronic device 300, and the electronic device 300 may include the same or similar components as or to those of the electronic device 101 illustrated in FIG. 1.

Referring to FIG. 1, the electronic device 300 may include a camera module 310 and a processor 320. In an embodiment, the electronic device 300 may further include at least one of a display 330 or a memory 340. In an embodiment, the camera module 310 may correspond to the camera module 180 of FIGS. 1 and 2. In an embodiment, the processor 320 may include at least one of the processor 120 illustrated in FIG. 1 or the image signal processor 260 illustrated in FIG. 2. In an embodiment, the display 330 may correspond to the display module 160 illustrated in FIG. 1. In an embodiment, the memory 340 may include at least one of the memory 130 illustrated in FIG. 1 or the memory 250 illustrated in FIG. 2.

According to an embodiment, the camera module 310 may acquire image data under control of the processor 320. According to an embodiment, the camera module 310 may continuously acquire first image data including first pixel data, second image data including second pixel data, third image data including third pixel data, and fourth image data including fourth pixel data under control of the processor 320. For example, the processor 320 may continuously acquire the first pixel data, the second pixel data, the third pixel data, and the fourth pixel data from the camera module 310 with time.

In an embodiment, the processor 320 may control the camera module 310 to continuously acquire $N^2$ pieces of image data by using an OIS function. In an embodiment, N refers to a natural number greater than or equal to 2. For example, the processor 320 may control the camera module 310 to continuously acquire the first image data, the second image data, the third image data, and the fourth image data. In another example, the processor 320 may control the camera module 310 to acquire first image data to ninth image data. The processor 320 may perform operations described in FIGS. 4 to 6 based on the $N^2$ pieces of image data. In an embodiment, the $N^2$ pieces of image data may include $N^2$ pieces of pixel data corresponding to the image data, respectively.

According to an embodiment, the camera module 310 may perform the OIS function. For example, the camera module 310 may use a lens shift method to shift a lens assembly included in the camera module 310 through the OIS function, and in another embodiment, the camera module 310 may use a sensor shift method to shift an image sensor 315 included in the camera module 310 through the OIS function. In an embodiment, the processor 320 may control the camera module 310 to continuously acquire a plurality of pieces of image data having different phases by using the OIS function. For example, the plurality of pieces of image data having the different phases may be understood as indicating that pixel data obtained through the same pixel in a scene captured through the camera module 310 corresponds to different positions of the scene in every image data. A phase difference will be described below with reference to FIG. 5.

According to an embodiment, the processor 320 may control the camera module 310 to cause the first image data, the second image data, the third image data, and the fourth image data to have different phases through the OIS function. The processor 320 may perform the OIS function to compensate for shaking, and may perform the OIS function to cause the plurality of pieces of image data to have different phases. In an embodiment, the processor 320 may use at least one piece of information of pre-designated OIS-related information or information obtained through a hall sensor included in the camera module 310 in order to control the camera module 310. The processor 320 may control the camera module 310 to acquire the plurality of pieces of image data having a phase difference that is required to improve a resolution by using the above-described information.

According to an embodiment, the camera module 310 may include the image sensor 315. The image sensor 315 may be understood as referring to the image sensor 230 illustrated in FIG. 2. In an embodiment, the camera module 310 may acquire image data through the image sensor 315.

According to an embodiment, the image sensor 315 may include a first pixel 311, a second pixel 312, a third pixel 313, and a fourth pixel 314 which have a 2×2 arrangement. For example, the first pixel 311, the second pixel 312, the third pixel 313, and the fourth pixel 314 may be pixels that are arranged adjacent to one another, and in another example, the first pixel 311, the second pixel 312, the third pixel 313, and the fourth pixel 314 may refer to pixels that are spaced apart from one another at regular intervals. In an example, the image sensor 315 may include a fifth pixel, a sixth pixel, a seventh pixel, an eighth pixel, a ninth pixel, a tenth pixel, an eleventh pixel, a twelfth pixel, and a thirteenth pixel which have a 3×3 arrangement. In an embodiment, the image sensor 315 may include $N^2$ pixels having an N×N arrangement. In this case, N is a natural number that is greater than or equal to 2. According to an embodiment, the $N^2$ pixels having the N×N arrangement may be understood as pixels included in at least some areas of the X×Y pixels included in the image sensor 315. For example, the N×N pixels may be understood as a basic unit of calculation for implementing embodiments disclosed in the disclosure among the X×Y pixels included in the image sensor 315.

According to an embodiment, the camera module 310 may acquire pixel data through at least one pixel of the first pixel 311, the second pixel 312, the third pixel 313, or the fourth pixel 314. For example, the camera module 310 may acquire first pixel data through at least one of the first pixel 311, the second pixel 312, the third pixel 313, or the fourth pixel 314 at a first time. The camera module 310 may acquire second pixel data through at least one of the first pixel 311, the second pixel 312, the third pixel 313, or the fourth pixel 314 at a second time which follows the first time. In this way, the camera module 310 may acquire the plurality of pieces of pixel data included in one piece of image data. In an embodiment, the processor 320 may utilize four pieces of image data continuously acquired (for example, the first image data, the second image data, the third image data, and the fourth image data) in order to generate one image frame.

According to an embodiment, the processor 320 may be understood as including at least one processor. For example, the processor 320 may include at least one of an application processor (AP), an image signal processor 260, and a communication processor (CP).

According to an embodiment, the processor 320 may acquire fifth pixel data based on the first pixel data, the second pixel data, the third pixel data, and the fourth pixel data which are acquired from the camera module 310. For example, the processor 320 may acquire the fifth pixel data by averaging the first pixel data, the second pixel data, the third pixel data, and the fourth pixel data. The processor 320 may acquire the fifth pixel data by calculating the center of mass with respect to the first pixel data, the second pixel data, the third pixel data, and the fourth pixel data. In another example, the processor 320 may acquire the fifth pixel data by giving a weight to at least one piece of pixel data of the first pixel data, the second pixel data, the third pixel data, and the fourth pixel data.

According to an embodiment, the processor 320 may generate a first image frame based on the fifth pixel data. For example, a resolution of the first image frame may be higher than a resolution of the first image data. In another example, artifacts (for example, a noise, a blur) included in the first image frame may be fewer than artifacts included in the first image data.

According to an embodiment, an execution screen of an application (for example, a camera application) which is executed by the processor 320 may be displayed on the display 330. In an embodiment, the processor 320 may output the first image frame on the display 330 as a preview. In another example, the processor 320 may output at least one of the first image data, the second image data, the third image data, or the fourth image data to the display 330 as a preview.

According to an embodiment, the display 330 may be integrally implemented with a touch panel. The display 330 may support a touch function, and may detect a user input (for example, a touch using a finger). The display 330 may transmit the user input to the processor 320. The display 330 may be connected with a display driver integrated circuit (DDIC) for driving the display 330, and the touch panel may be connected with a touch integrated circuit (IC) for detecting touch coordinates and processing a touch-related algorithm. In an embodiment, the DDIC and the touch IC may be integrally formed with each other. In another embodiment, the DDIC and the touch IC may be separately provided. The DDIC and/or the touch IC may be electrically connected with the processor 320.

According to an embodiment, the memory 340 may store various programming languages and instructions by the processor 320. For example, the processor 320 may execute an application by executing a code written in a programming language stored in the memory 340, and may control a variety of hardware. In addition, the processor 320 may configure and support an appropriate image-capturing mode to cause the camera module 310 to perform an operation intended by a user. In an embodiment, the processor 320 may store the first image frame in the memory 340. In an embodiment, the processor 320 may store at least one piece of image data of the first image data, the second image data, the third image data or the fourth image data in the memory 340 along with the first image frame.

Figure 4:
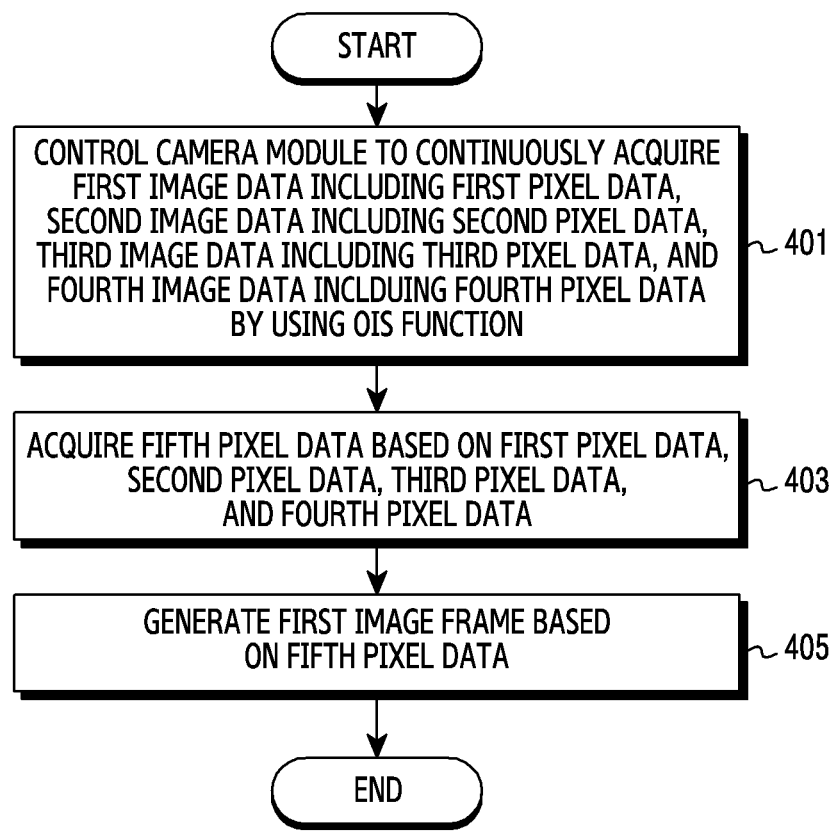
FIG. 4 is a flowchart illustrating actions of an electronic device for improving quality of an image according to an embodiment of the disclosure.

FIG. 4 is a flowchart illustrating actions of the electronic device 300 for improving quality of an image according to an embodiment of the disclosure. The actions explained in FIG. 4 may be performed by the processor 120 illustrated in FIG. 1, the image signal processor 260 illustrated in FIG. 2, or the processor 320 illustrated in FIG. 3.

According to an embodiment, in action 401, the processor 320 may control the camera module 310 to continuously acquire first image data including first pixel data, second image data including second pixel data, third image data including third pixel data, and fourth image data including fourth pixel data by using the OIS function.

According to an embodiment, the camera module 310 may shift the lens assembly while performing the OIS function by using the OIS function of the lens shift method. The camera module 310 may acquire the first image data, the second image data, the third image data, and the fourth image data through the shifted lens assembly. According to another embodiment, the camera module 310 may shift the image sensor 315 while performing the OIS function by using the OIS function of the sensor shift method. The camera module 310 may acquire the first image data, the second image data, the third image data, and the fourth image data through the shifted image sensor 315.

According to an embodiment, the camera module 310 may provide the first image data, the second image data, the third image data, and the fourth image data which are acquired while performing the OIS function to the processor 320.

According to an embodiment, the image sensor 315 included in the camera module 310 may include a first pixel 311, a second pixel 312, a third pixel 313, and a fourth pixel 314 which have a 2×2 arrangement. The camera module 310 may acquire pixel data through the first pixel 311, the second pixel 312, the third pixel 313, and the fourth pixel 314. For example, the first image data that the processor 320 acquires from the camera module 310 may include first pixel data which is acquired through at least one pixel of the first pixel 311, the second pixel 312, the third pixel 313, or the fourth pixel 314.

According to an embodiment, in action 403, the processor 320 may acquire fifth pixel data based on the first pixel data, the second pixel data, the third pixel data, and the fourth pixel data.

According to an embodiment, the processor 320 may acquire a part of the fifth pixel data based on the first pixel data, the second pixel data, the third pixel data, and the fourth pixel data which are acquired through the first pixel 311. According to another embodiment, the processor 320 may acquire another part of the fifth pixel data based on the first pixel data and the third pixel data which are acquired through the second pixel 312, and the second pixel data and the fourth pixel data which are acquired through the first pixel 311. According to another embodiment, the processor 320 may acquire another part of the fifth pixel data based on the fourth pixel data which is acquired through the first pixel 311, the third pixel data which is acquired through the second pixel 312, the second pixel data which is acquired through the third pixel 313, and the first pixel data which is acquired through the fourth pixel 314. The action of acquiring the fifth pixel data will be described below with reference to FIG. 6.

According to an embodiment, the processor 320 may acquire the fifth pixel data by averaging the first pixel data, the second pixel data, the third pixel data, and the fourth pixel data. The process of acquiring the average of the pixel data described above may be understood as applying a low pass filter (LPF) having a coefficient of $$\begin{bmatrix} 0.25 & 0.25 \\ 0.25 & 0.25 \end{bmatrix}$$

to the first pixel data, the second pixel data, the third pixel data, and the fourth pixel data. The action of acquiring the fifth pixel data will be described below with reference to FIG. 6.

According to an embodiment, in action 405, the processor 320 may generate a first image frame based on the fifth pixel data.

According to an embodiment, the processor 320 may generate the first image frame including the fifth pixel data. In an embodiment, a resolution of the first image frame may be higher than a resolution of the first image data (or the second image data, the third image data, the fourth image data). In an embodiment, the number of pixels of the first image frame may be larger than the number of pixels of the first image data (or the second image data, the third image data, the fourth image data). In an embodiment, artifacts (for example, a noise, a blur) included in the first image frame may be fewer than artifacts included in the first image data (or the second image data, the third image data, the fourth image data).

According to an embodiment, the processor 320 may output the first image frame to the display 330 as a preview. According to an embodiment, the processor 320 may store the first image frame in the memory 340.

According to an embodiment, the processor 320 may output at least one of the first image data, the second image data, the third image data, or the fourth image data to the display 330 as a preview. For example, the processor 320 may display the first image data on the display 330 as a preview image while capturing an image. In an embodiment, when a certain area of the preview is magnified at a designated ratio or higher, the processor 320 may output the first image frame to the display 330 as a preview. For example, the processor 320 may receive a user input for magnifying the preview. When a certain area of the preview is magnified at a designated ratio or higher according to the user input, the processor 320 may output a part of the first image frame corresponding to the certain area as a preview. In an embodiment, the designated ratio may be determined based on the resolution of the first image data (or the second image data, the third image data, the fourth image data), and the resolution of the first image frame. For example, when the number of pieces of pixel data necessary for displaying the certain area on the display 330 as a preview is larger than the number of pieces of pixel data included in the certain area in the first image data, the processor 320 may determine that the certain area of the preview is magnified at the designated ratio or higher.

According to an embodiment, when a magnification is set to less than the designated ratio, the processor 320 may control the camera module 310 to acquire the first image data, instead of performing actions 401 to 405, and, when the magnification is set to the designated ratio or higher, the processor 320 may control the camera module 310 to perform actions 401 to 405. According to an embodiment, when the magnification is set to the designated ratio or higher, the processor 320 may perform actions 401 to 405 with respect to some areas of the image data acquired through the image sensor 315. For example, some areas may refer to areas that are cropped from the image data as some areas are magnified at the designated ratio or higher. According to an embodiment, when the magnification is set to less than the designated ratio, the processor 320 may provide the first image data to the display 330 as a preview, and, when the magnification is set to the designated ratio or higher, the processor 320 may provide the first image frame to the display 330 as a preview.

Figure 5:
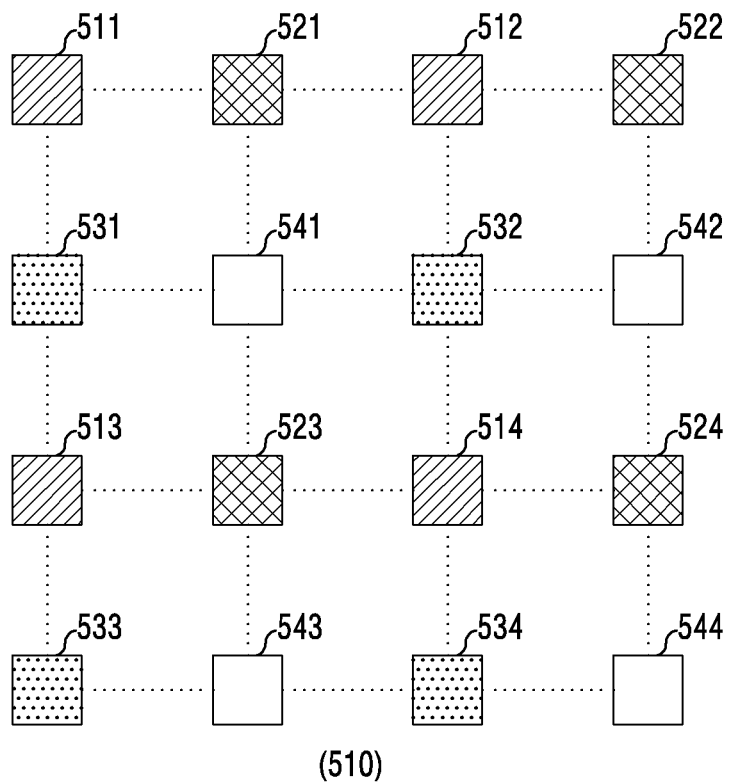
FIG. 5 is a view illustrating examples of first image data, second image data, third image data, and fourth image data which are acquired by using an OIS function according to an embodiment of the disclosure.
Figure 5:
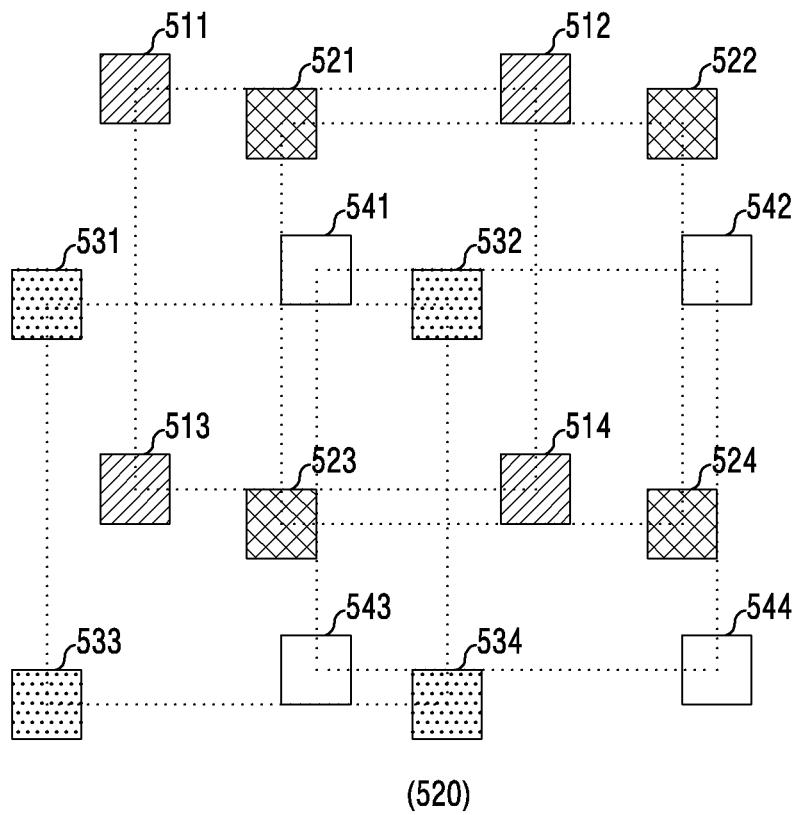

FIG. 5 is a view illustrating examples of first image data, second image data, third image data, and fourth image data which are acquired by using an OIS function according to an embodiment of the disclosure.

Referring to FIG. 5, reference numerals 510 and 520 indicate examples of first image data, second image data, third image data, and fourth image data that the processor 320 acquires from the camera module 310, respectively. In an embodiment, the first image data may include first pixel data 511, 512, 513, or 514, the second image data may include second pixel data 521, 522, 523, or 524, the third image data may include third pixel data 531, 532, 533, or 534, and the fourth image data may include fourth pixel data 541, 542, 543, or 544.

Figure 6:
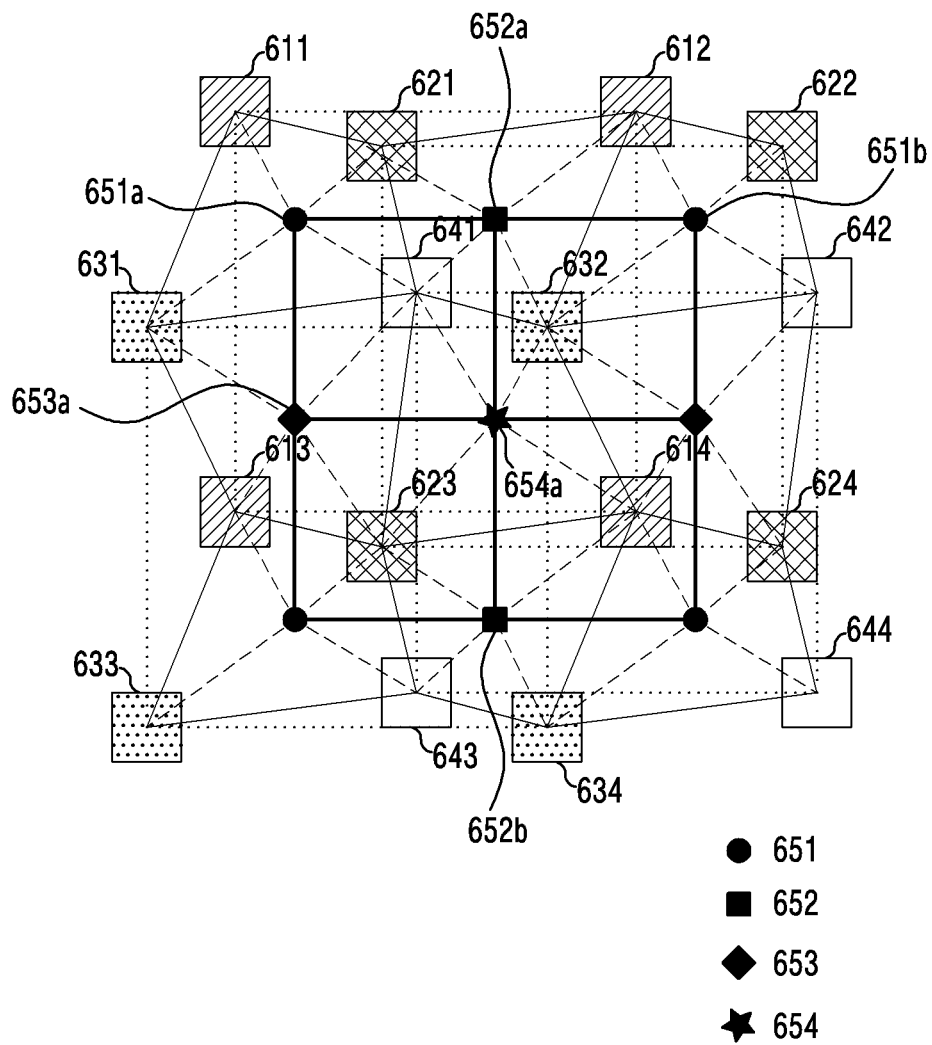
FIG. 6 is a view illustrating an example of generating a first image frame based on first image data, second image data, third image data, and fourth image data according to an embodiment of the disclosure.

Referring to FIGS. 5 and 6, the first pixel data 511, 512, 513, or 514 may be distinguished and referenced as 1-1 pixel data 511, 1-2 pixel data 512, 1-3 pixel data 513, or 1-4 pixel data 514 for the convenience of explanation. Likewise, the second pixel data 521, 522, 523, or 524 may be distinguished and referenced as 2-1 pixel data 521, 2-2 pixel data 522, 2-3 pixel data 523 or 2-4 pixel data 524. The third pixel data 531, 532, 533, or 534 may be distinguished and referenced as 3-1 pixel data 531, 3-2 pixel data 532, 3-3 pixel data 533 or 3-4 pixel data 534. The fourth pixel data 541, 542, 543, or 544 may be distinguished and referenced as 4-1 pixel data 541, 4-2 pixel data 542, 4-3 pixel data 543 or 4-4 pixel data 544. In an embodiment, the 1-1 pixel data 511 may refer to pixel data that is acquired through the first pixel 311 at a first time, the 1-2 pixel data 512 may refer to pixel data that is acquired through the second pixel 312 at the first time, the 1-3 pixel data 513 may refer to pixel data that is acquired through the third pixel 313 at the first time, and the 1-4 pixel data 514 may refer to pixel data that is acquired through the fourth pixel 314 at the first time. In an embodiment, the 2-1 pixel data 521 may refer to pixel data that is acquired through the first pixel 311 at a second time, the 2-2 pixel data 522 may refer to pixel data that is acquired through the second pixel 312 at the second time, the 2-3 pixel data 513 may refer to pixel data that is acquired through the third pixel 313 at the second time, and the 2-4 pixel data 524 may refer to pixel data that is acquired through the fourth pixel 314 at the second time. The above explanation may be applied to the third pixel data 531, 532, 533, or 534, the fourth pixel data 541, 542, 543, or 544.

According to an embodiment, the pixel data illustrated in FIG. 5 may be understood as pixel data included in at least some areas of each piece of image data. A position where each piece of pixel data is illustrated in FIG. 5 may be understood as referring to a position corresponding to each piece of pixel data in a scene captured through the camera module 310. In the descriptions related to FIGS. 5 and 6, a gap between pixel data may be understood as referring to a gap between positions corresponding to pixel data in the scene.

According to an embodiment, when the processor 320 exactly controls the camera module 310, the first image data, the second image data, the third image data, and the fourth image data which have a position relation as indicated by reference numeral 510 may be acquired in at least some image areas. For example, the processor 320 may control the camera module 310 to acquire, in at least some image areas, the plurality of pieces of image data in which the 2-1 pixel data 521 is positioned between the 1-1 pixel data 511 and the 1-2 pixel data 512, the 3-1 pixel data 531 is positioned between the 1-1 pixel data 511 and the 1-3 pixel data 513, and the 4-1 pixel data 541 is positioned between the 1-1 pixel data 511 and the 1-4 pixel data 514.

According to an embodiment, although the processor 320 tries to control the camera module 310 to acquire the image data having the position relation as indicated by reference numeral 510, the processor 320 may acquire first image data, second image data, third image data, and fourth image data that have a position relation as indicated by reference numeral 520 due to a motion of the electronic device 300 or a distortion caused by a lens. For example, although the processor 320 controls the camera module 310 by using the OIS function in order to acquire the plurality of pieces of image data having the position relation as indicated by reference numeral 510, the processor 320 may acquire a plurality of pieces of image data that has the position relation as indicated by reference numeral 520 in at least some image areas.

According to an embodiment, in the case of reference numeral 510, a gap between pixel data may be regular. For example, in the case of reference numeral 510, a gap between the 1-1 pixel data 511 and the 2-1 pixel data 521 may be the same as a gap between the 1-1 pixel data 511 and the 3-1 pixel data 531. According to an embodiment, in the case of reference numeral 520, gaps among pixel data may be irregular. For example, in the case of reference numeral 520, a gap between the 1-1 pixel data 511 and the 2-1 pixel data 521 may be different from a gap between the 1-1 pixel data 511 and the 3-1 pixel data 531.

According to an embodiment, the processor 320 may acquire a first image frame by performing image-processing with respect to the first image data, the second image data, the third image data, and the fourth image data which are acquired from the camera module 310. For example, the processor 320 may generate the first image frame that has a resolution enhanced higher than that of the first image data (or the second image data, the third image data, the fourth image data). In another example, the processor 320 may generate the first image frame that has fewer artifacts than those of the first image data (or the second image data, the third image data, the fourth image data).

In an embodiment, the processor 320 may perform a method explained in FIG. 6 when the plurality of pieces of image data acquired from the camera module 310 have the position relation as indicated by reference numeral 510, and may perform the method explained in FIG. 6 even when the plurality of pieces of image data have the position relation as indicated by reference numeral 520. In an embodiment, the processor 320 may generate the first image frame by performing the method explained in FIG. 6 with respect to the plurality of pieces of image data having the position relation of reference numeral 510 or reference numeral 520.

FIG. 6 illustrates an example of generating a first image frame based on first image data, second image data, third image data, and fourth image data according to an embodiment of the disclosure.

According to an embodiment, the first image data, the second image data, the third image data, and the fourth image data which are illustrated in FIG. 6 may be understood as the first image data, the second image data, the third image data, and the fourth image data which are acquired as indicated by reference numeral 520 of FIG. 5. For example, first pixel data 611, 612, 613, or 614 may correspond to the first pixel data 511, 512, 513, or 514 of FIG. 5. Alternatively, 1-1 pixel data 611 may correspond to the 1-1 pixel data 511 of FIG. 5. In the explanation related to FIG. 6, the first pixel data 611, 612, 613, or 614 may be distinguished and referenced as 1-1 pixel data 611, 1-2 pixel data 612, 1-3 pixel data 613, or 1-4 pixel data 614.

According to an embodiment, the image sensor 315 included in the camera module 310 may include a first pixel 311, a second pixel 312, a third pixel 313, and a fourth pixel 314 which have a 2×2 arrangement. In an embodiment, it may be understood that pixel data 611, 621, 631, 641 on the left upper end among the plurality of pieces of pixel data included in the plurality of pieces of image data illustrated in FIG. 6 is data that is acquired through the first pixel 311, pixel data 612, 622, 632, 642 on the right upper end is data that is acquired through the second pixel 312, pixel data 613, 623, 633, 643 on the left lower end is data that is acquired through the third pixel 313, and pixel data 614, 624, 634, 644 on the right lower end is data that is acquired through the fourth pixel 314. For example, the first image data may include the 1-1 pixel data 611 which is acquired through the first pixel 311, the 1-2 pixel data 612 which is acquired through the second pixel 312, the 1-3 pixel data 613 which is acquired through the third pixel 313, and the 1-4 pixel data 614 which is acquired through the fourth pixel 314.

According to an embodiment, the processor 320 may acquire fifth pixel data 651, 652, 653, or 654 based on the first pixel data 611, 612, 613 or 614, the second pixel data 621, 622, 623 or 624, the third pixel data 631, 632, 633, or 634, and the fourth pixel data 641, 642, 643, or 644. In an embodiment, the processor 320 may acquire the fifth pixel data 651, 652, 653, or 654 by averaging the first pixel data 611, 612, 613 or 614, the second pixel data 621, 622, 623 or 624, the third pixel data 631, 632, 633, or 634, and the fourth pixel data 641, 642, 643, or 644. In another embodiment, the processor 320 may acquire the fifth pixel data 651, 652, 653, or 654 by adding up the first pixel data 611, 612, 613 or 614, the second pixel data 621, 622, 623 or 624, the third pixel data 631, 632, 633, or 634, and the fourth pixel data 641, 642, 643, or 644.

According to an embodiment, the processor 320 may acquire fifth pixel data 651*a* based on the first pixel data 611, the second pixel data 621, the third pixel data 631, and the fourth pixel data 641 which are acquired through the first pixel 311. For example, the processor 320 may acquire the fifth pixel data 651*a* by averaging the 1-1 pixel data 611, the 2-1 pixel data 621, the 3-1 pixel data 631, and the 4-1 pixel data 641. The processor 320 may acquire the fifth pixel data 651*a* by calculating the center of mass with respect to the 1-1 pixel data 611, the 2-1 pixel data 621, the 3-1 pixel data 631, and the 4-1 pixel data 641 by using a filter of $$\begin{bmatrix} 0.25 & 0.25 \\ 0.25 & 0.25 \end{bmatrix}.$$

The fifth pixel data 651a may be positioned at the center of mass of the 1-1 pixel data 611, the 2-1 pixel data 621, the 3-1 pixel data 631, and the 4-1 pixel data 641.

In an embodiment, the explanation of the fifth pixel data 651a may be applied to pixel data indicated by reference numeral 651 in FIG. 6. For example, the processor 320 may acquire fifth pixel data 651b based on the 1-2 pixel data 612, the 2-2 pixel data 622, the 3-2 pixel data 632, and the 4-2 pixel data 642 which are acquired through the second pixel 312.

According to an embodiment, the processor 320 may acquire fifth pixel data 652a based on the first pixel data 612 and the third pixel data 632 which are acquired through the second pixel 312, and the second pixel data 621 and the fourth pixel data 641 which are acquired through the first pixel 311. For example, the processor 320 may acquire the fifth pixel data 652a by averaging the 1-2 pixel data 612, the 3-2 pixel data 632, the 2-1 pixel data 621, and the 4-1 pixel data 641. The processor 320 may acquire the fifth pixel data 652a by calculating the center of mass with respect to the 1-2 pixel data 612, the 2-1 pixel data 621, the 3-2 pixel data 632, and the 4-1 pixel data 641 by using a filter of $$\begin{bmatrix} 0.25 & 0.25 \\ 0.25 & 0.25 \end{bmatrix}.$$

The fifth pixel data 652a may be positioned at the center of mass of the 1-2 pixel data 612, the 3-2 pixel data 632, the 2-1 pixel data 621, and the 4-1 pixel data 641.

In an embodiment, the above explanation may be applied to pixel data indicated by reference numerals 652 and 653 in FIG. 6. For example, the processor 320 may acquire fifth pixel data 653a based on the third pixel data 631 and the fourth pixel data 641 which are acquired through the first pixel 311, and the first pixel data 613 and the second pixel data 623 which are acquired through the third pixel 313. That is, the processor 320 may acquire the fifth pixel data 653a based on the 1-3 pixel data 513, the 2-3 pixel data 523, the 3-1 pixel data 631, and the 4-1 pixel data 541. In another example, the processor 320 may acquire fifth pixel data 652b based on the second pixel data 623 and the fourth pixel data 643 which are acquired through the third pixel 313, and the first pixel data 614 and the third pixel data 634 which are acquired through the fourth pixel 314.

According to an embodiment, the processor 320 may acquire fifth pixel data 654a based on the fourth pixel data 641 which is acquired through the first pixel 311, the third pixel data which is acquired through the second pixel 312, the second pixel data 623 which is acquired through the third pixel 313, and the first pixel data 614 which is acquired through the fourth pixel 314. The processor 320 may acquire the fifth pixel data 654a by calculating the center of mass with respect to the 1-4 pixel data 614, the 2-3 pixel data 623, the 3-2 pixel data 632, and the 4-1 pixel data 641 by using a filter of $$\begin{bmatrix} 0.25 & 0.25 \\ 0.25 & 0.25 \end{bmatrix}.$$

The fifth pixel data 654a may be positioned at the center of mass of the 4-1 pixel data 641, the 3-2 pixel data 632, the 2-3 pixel data 623, and the 1-4 pixel data 614.

According to an embodiment, the processor 320 may generate a first image frame based on the acquired fifth pixel data 651, 652, 653, and 654. The processor 320 may acquire the first image frame which has a regular gap between the fifth pixel data 651, 652, 653, 654 through the operations described in relation to FIG. 6. For example, a gap between the fifth pixel data 651a and the fifth pixel data 652a may correspond to a half of a gap between the first pixel data 611 and the first pixel data 612.

According to an embodiment, the processor 320 may acquire fifth pixel data (not shown) by utilizing a method other than the method of averaging the first pixel data 611, 612, 613, or 614, the second pixel data 621, 622, 623, or 624, the third pixel data 631, 632, 633, or 634, and the fourth pixel data 641, 642, 643, or 644. For example, the processor 320 may perform calculation other than calculation of the center of mass as long as the gap between the fifth pixel data (not shown) is identical to the gap between the fifth pixel data 651, 652, 653, 654 shown in FIG. 6. In an embodiment, the processor 320 may generate the first image frame by giving a weight to at least one piece of image data of the first image data, the second image data, the third image data, or the fourth image data.

According to an embodiment, a resolution of the first image frame may be higher than a resolution of the first image data (or the second image data, the third image data, the fourth image data). For example, the gap between the fifth pixel data 651, 652, 653, 654 may be reduced to the half of the gap between the first pixel data 611, 612, 613, 614, so that the resolution of an image may be enhanced.

According to an embodiment, artifacts included in the first image frame may be fewer than artifacts included in the first image data. For example, noises included in the first image frame may be fewer than noises included in the first image data. The processor 320 may reduce the artifacts included in the plurality of pieces of image data through the operation of averaging the first pixel data 611, 612, 613, or 614, the second pixel data 621, 622, 623, or 624, the third pixel data 631, 632, 633, or 634, and the fourth pixel data 641, 642, 643, or 644. In an embodiment, the filter of $$\begin{bmatrix} 0.25 & 0.25 \\ 0.25 & 0.25 \end{bmatrix}$$

may correspond to a low pass filter (LPF), and a noise may correspond to a high frequency, and hence, the processor 320 may remove the noises included in the plurality of pieces of image data through the filter.

According to an embodiment, the processor 320 may reduce an amount of blur included in the first image frame by adjusting a conversion gain of the image sensor 315. The blur included in the first image frame may be caused by a global motion or a local motion which is made while the camera module 310 acquires the plurality of pieces of image data (for example, four pieces of image data). When the processor 320 increases the conversion gain of the image sensor 315, an image-capturing time may be reduced, and accordingly, the amount of blur included in the first image frame may be reduced.

According to an embodiment, the processor 320 may add up the first pixel data 611, 612, 613, or 614, the second pixel data 621, 622, 623, or 624, the third pixel data 631, 632, 633, or 634, and the fourth pixel data 641, 642, 643, or 644. For example, the processor 320 may apply a filter of $$\begin{bmatrix} 1 & 1 \\ 1 & 1 \end{bmatrix}$$

to the first pixel data 611, 612, 613, or 614, the second pixel data 621, 622, 623, or 624, the third pixel data 631, 632, 633, or 634, and the fourth pixel data 641, 642, 643, or 644. According to an embodiment, the processor 320 may reduce the amount of blur included in the first image frame by adding up the pixel data which is continuously acquired through the image sensor 315. For example, when the processor 320 uses the filter of $$\begin{bmatrix} 1 & 1 \\ 1 & 1 \end{bmatrix},$$

the processor 320 may control the camera module 310 to reduce an exposure time of the image sensor 315. When the image-capturing time required to acquire the first image data to the fourth image data is reduced, the global motion or the local motion may be reduced, and hence, the amount of blur included in the first image frame may be reduced.

Figure 7:
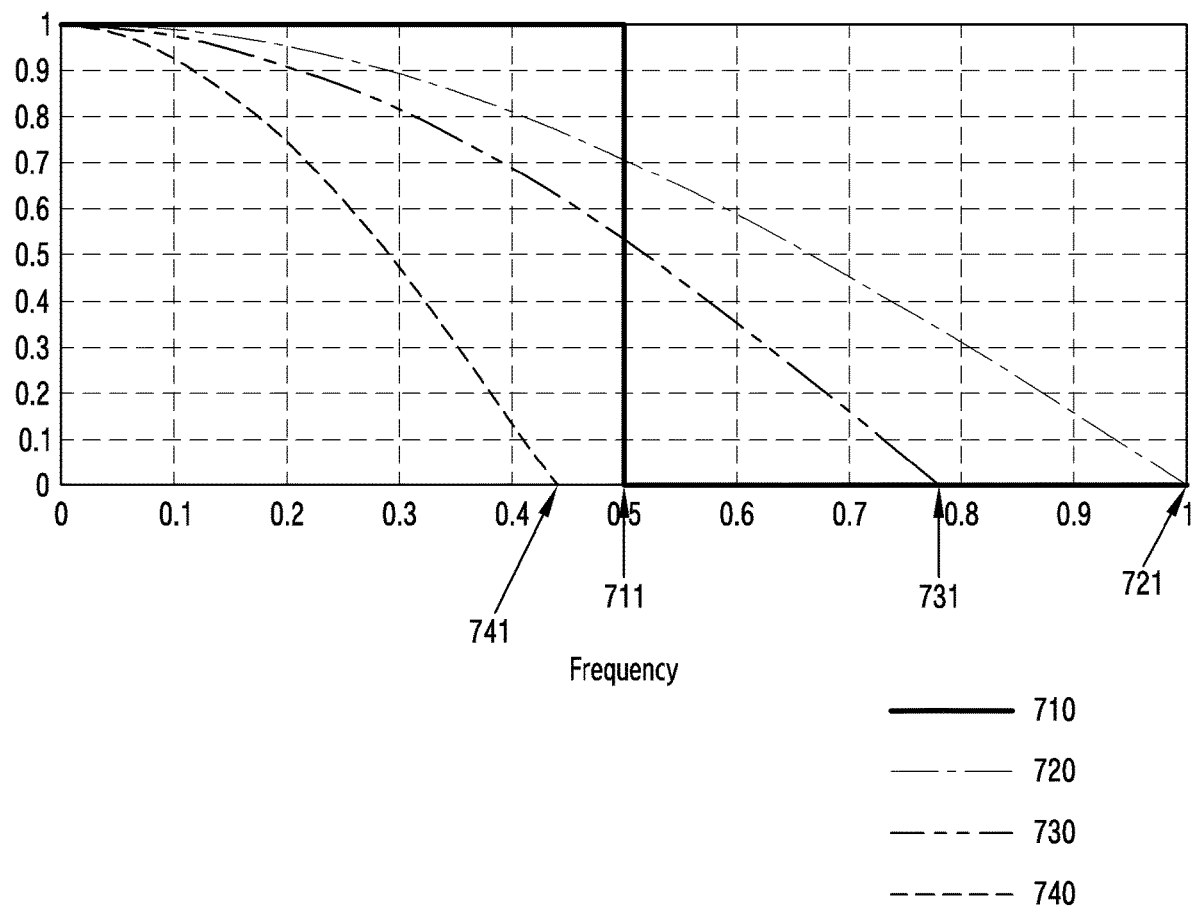
FIG. 7 is a view illustrating an example of change in a Nyquist frequency according to an embodiment of the disclosure.

FIG. 7 illustrates a change in the Nyquist frequency according to an embodiment of the disclosure.

According to an embodiment, the Nyquist frequency refers to a frequency that is double a maximum frequency that data has in order to reproduce the data to be sampled again. However, in the disclosure, the Nyquist frequency may be understood as meaning a maximum frequency at which the camera module 310 captures an image. For example, the camera module 310 may acquire image data of a scene having a frequency lower than or equal to the Nyquist frequency, but may have difficulty in acquiring image data of a scene having a frequency higher than the Nyquist frequency. That is, as the Nyquist frequency increases, the resolution of an image may be higher.

Referring to FIG. 7, reference numerals 710, 720, 730, and 740 indicates a ratio of image data that the processor 320 acquires according to a frequency of a scene. The horizontal axis of the graph illustrated in FIG. 7 may be understood as indicating conversion into 1 from a maximum frequency at which the processor 320 captures an image by acquiring four pieces of image data (for example, first image data, second image data, third image data, and fourth image data). The vertical axis of the graph illustrated in FIG. 7 may be understood as indicating a ratio of image data that the processor 320 acquires at every frequency.

According to an embodiment, reference numeral 710 illustrates a case in which the camera module 310 acquires one piece of image data (for example, first image data). According to an embodiment, the processor 320 may upscale the image data after acquiring one piece of image data from the camera module 310. For example, the processor 320 may resize the first image data 2×2 times larger by performing bilinear interpolation with respect to the first image data. According to an embodiment, when the processor 320 acquires one piece of image data, the Nyquist frequency 711 may be 0.5.

According to an embodiment, reference numeral 720 illustrates a case in which the camera module 310 acquires four pieces of image data (for example, first image data, second image data, third image data, and fourth image data) having the position relation indicated by reference numeral 510 of FIG. 5. The processor 320 may generate a first image frame by calculating the center of mass with respect to the first pixel data, the second pixel data, the third pixel data, and the fourth pixel data by using a filter of $$\begin{bmatrix} 0.25 & 0.25 \\ 0.25 & 0.25 \end{bmatrix}.$$

In this case, the filter may correspond to an LPF, and hence, as the frequency of a scene increases, the amount of image data acquired may decrease.

In an embodiment, in the case of reference numeral 720, the Nyquist frequency 721 may be 1. In an embodiment, comparing the case of reference numeral 720 and the case of reference numeral 710, when the processor 320 performs image processing by acquiring four pieces of image data, the Nyquist frequency may increase two times higher than when the processor 320 acquires one piece of image data. The processor 320 may acquire image data regarding a scene that has a frequency higher than 0.5. In an embodiment, comparing the case of reference numeral 720 and the case of reference numeral 710, when the processor 320 performs image processing by acquiring four pieces of image data, a resolution may increase two times higher than when the processor 320 acquires one piece of image data.

According to an embodiment, reference numeral 730 illustrates a case in which the processor acquires four pieces of image data (for example, first image data, second image data, third image data, and fourth image data) having the position relation indicated by reference numeral 520 of FIG. 5 or 6. The processor 320 may generate the first image frame through the method described in FIG. 6.

In an embodiment, in the case of reference numeral 730, the Nyquist frequency 731 may be smaller than 1. When gaps among the first pixel data, the second pixel data, the third pixel data, and the fourth pixel data which are acquired through the camera module 310 are irregular as indicated by reference numeral 520 of FIG. 5, the Nyquist frequency 731 may correspond to 0.7 to 0.8. The processor 320 may acquire image data regarding a scene having a frequency higher than 0.5. The processor 320 may generate an image frame of a corresponding frequency domain by amplifying image data acquired for a scene having a frequency higher than 0.5.

According to an embodiment, reference numeral 740 illustrates a case in which at least one piece of image data of the second image data, the third image data, or the fourth image data is acquired at a different position from that controlled by the processor 320 with reference to the first image data. According to the description in FIG. 5, the processor 320 may control the camera module 310 to position the second pixel data 521 between the first pixel data 511 and the first pixel data 512. However, the processor 320 may acquire first image data and second image data in which the second pixel data 621 is positioned in a different direction, rather than being positioned between the first pixel data 611 and the first pixel data 612, due to a motion of the electronic device 300 or a lens distortion.

In an embodiment, in the case of reference numeral 740, the Nyquist frequency 741 may be smaller than 0.5. The processor 320 may reduce artifacts included in the plurality of pieces of image data through the method described in FIG. 6 even when at least one piece of image data of the second image data, the third image data, or the fourth image data is acquired at a different position from that controlled by the processor 320 with reference to the first image data. For example, the processor 320 may generate a first image frame from which a noise is removed or reduced even when a noise is included in the plurality of pieces of image data acquired from the camera module 310.

Figure 8A:
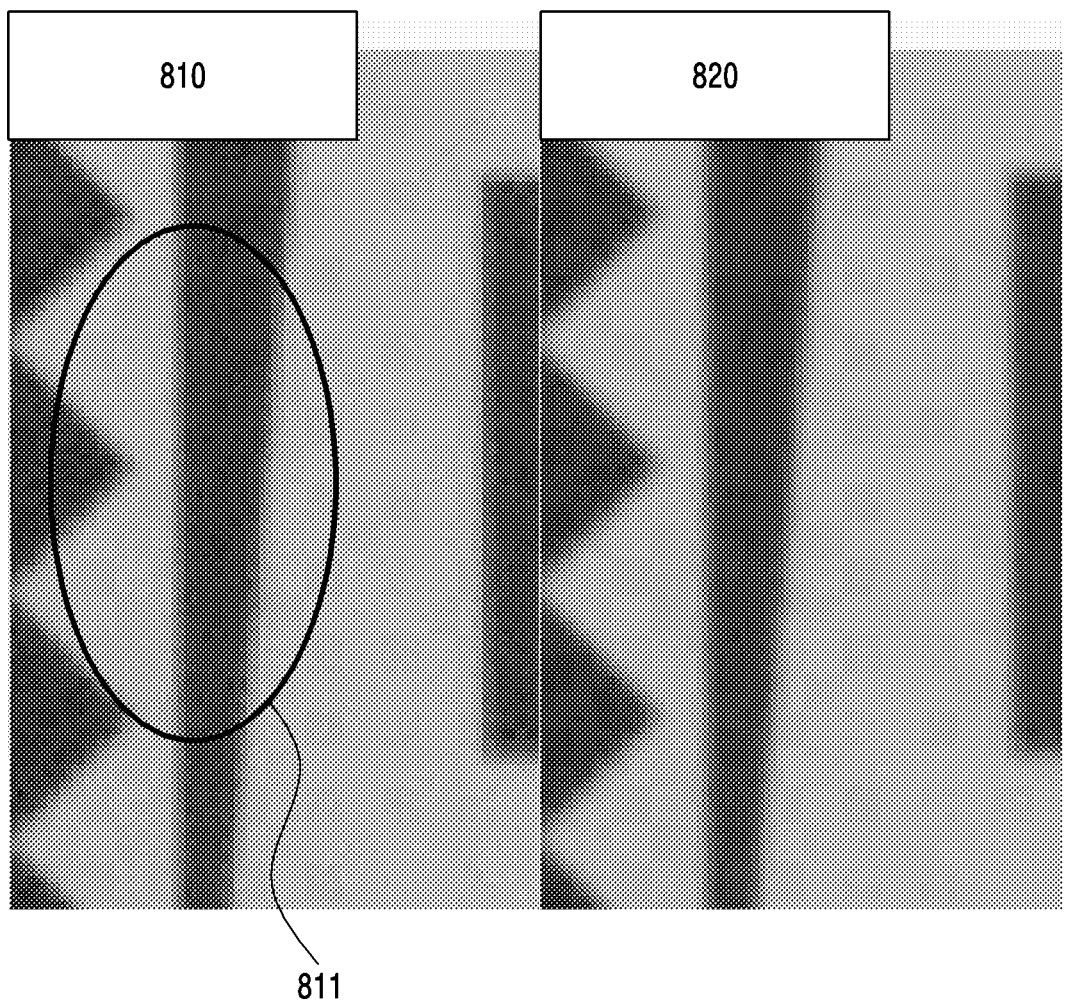
FIG. 8A is a view illustrating an example of reduction of an artifact included in an image according to an embodiment of the disclosure.

FIG. 8A illustrates an example of reduction of artifacts included in an image according to an embodiment of the disclosure.

Referring to FIG. 8A, reference numeral 810 illustrates an example of an image frame which is acquired when the disclosure is not applied. Reference numeral 820 illustrates an example of a first image frame which is generated by acquiring fifth pixel data based on first pixel data, second pixel data, third pixel data, and fourth pixel data according to an embodiment of the disclosure.

Referring to FIG. 8A, an image frame 810 acquired according to related-art technology may include a jagging artifact 811. However, a jagging artifact may be reduced in a first image frame 820 acquired according to the disclosure.

According to an embodiment, the processor 320 may acquire fifth pixel data by calculating the center of mass with respect to first pixel data, second pixel data, third pixel data, and fourth pixel data which are acquired from the camera module 310, and may generate the first image frame 820 based on the fifth pixel data. A filter of $$\begin{bmatrix} 0.25 & 0.25 \\ 0.25 & 0.25 \end{bmatrix}$$

that the processor 320 uses to calculate the center of mass may be an LPF, and an artifact included in image data may correspond to a high frequency. Accordingly, the processor 320 may acquire the first image frame 820 from which the artifact is removed or mitigated.

Figure 8B:
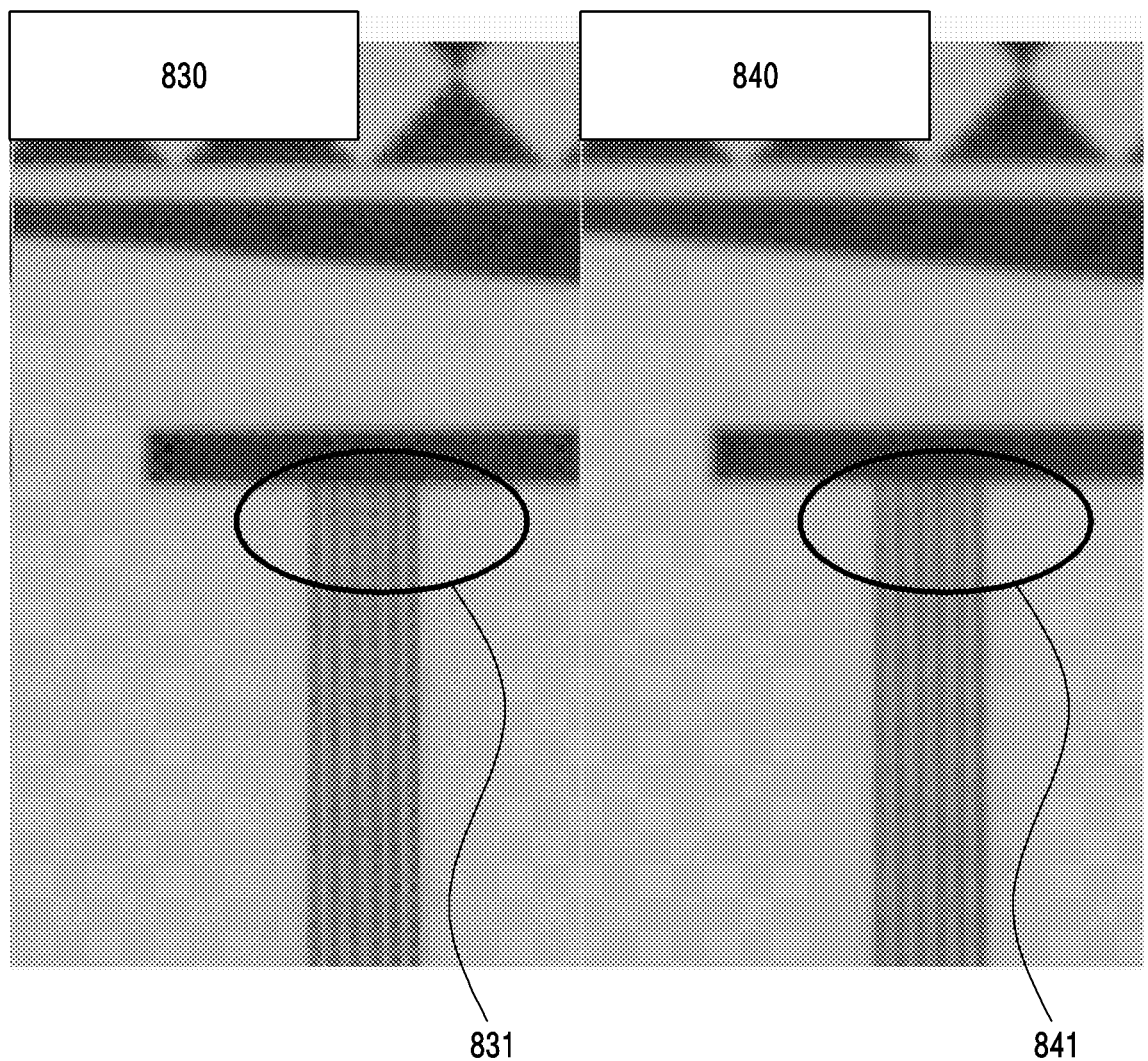
FIG. 8B is a view illustrating an example of increase of a resolution of an image according to an embodiment of the disclosure.

FIG. 8B illustrates an example of increase of a resolution of an image according to an embodiment of the disclosure.

Referring to FIG. 8B, reference numeral 830 illustrates an example of an image frame which is acquired when the disclosure is not applied. Reference numeral 840 illustrates an example of a first image frame which is generated by acquiring fifth pixel data based on first pixel data, second pixel data, third pixel data, and fourth pixel data according to an embodiment of the disclosure.

Referring to FIG. 8B, a resolution of the first image frame 840 acquired according to the disclosure is higher than a resolution of the image frame 830 acquired according to the related-art technology. For example, compared to a high frequency domain 831 of the image frame 830 acquired according to the related-art technology, a high frequency domain 841 of the first image frame 840 acquired according to the disclosure may have a higher resolution.

According to an embodiment, the processor 320 may acquire fifth pixel data having a regular position relation by calculating the center of mass even when gaps among the first pixel data, the second pixel data, the third pixel data, and the fourth pixel data are irregular. The processor 320 may generate the first image frame 840 based on the fifth pixel data having a regular position relation. Accordingly, the resolution of the first image frame 840 acquired according to the disclosure may be higher than the resolution of the image frame 830 acquired according to the related-art technology.

Figure 9:
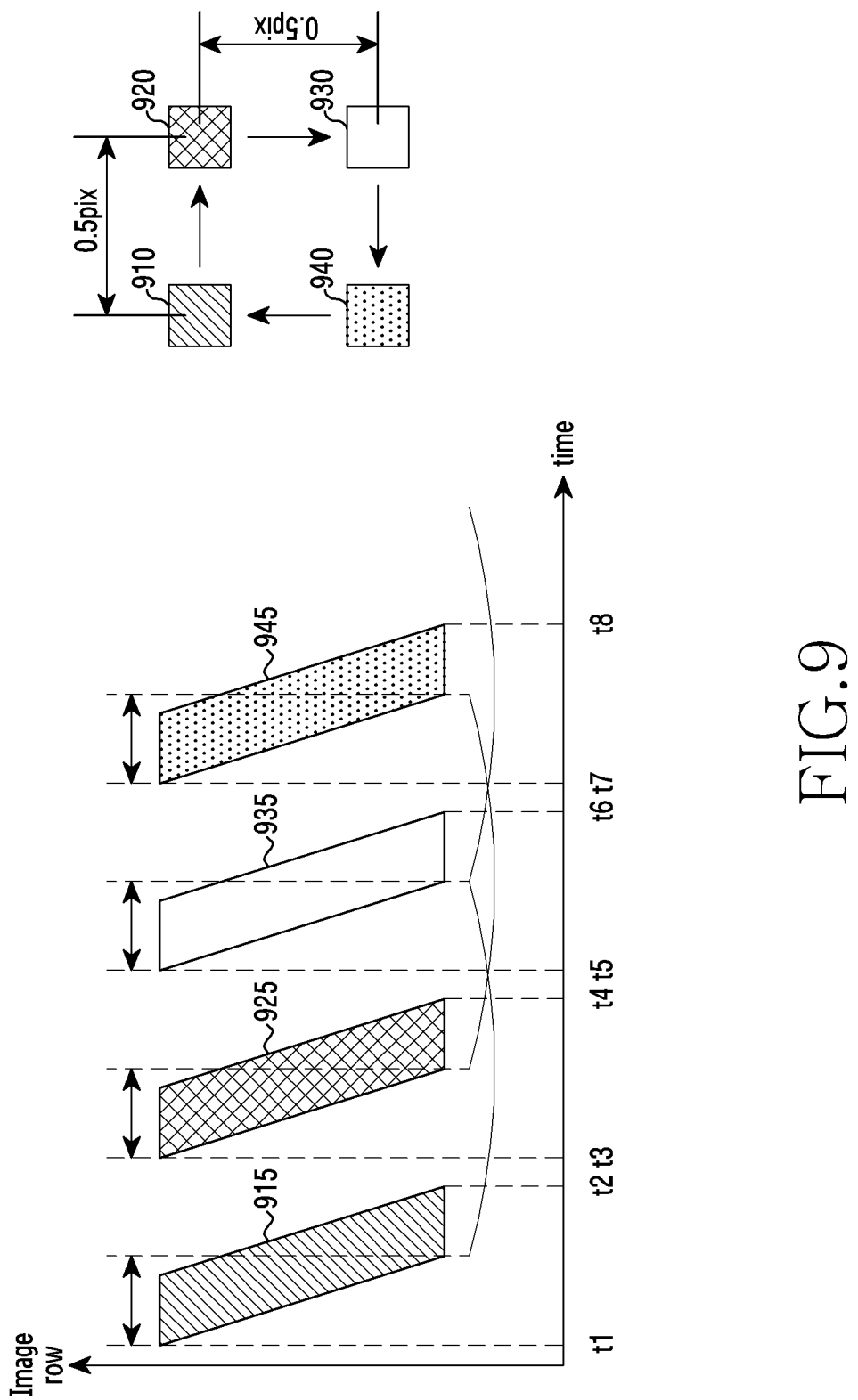
FIG. 9 is a view illustrating an example of creating a video based on first image data, second image data, third image data, and fourth image data according to an embodiment of the disclosure.

FIG. 9 illustrates an example of generating a moving image based on first image data, second image data, third image data, and fourth image data according to an embodiment of the disclosure.

According to an embodiment, the processor 320 may acquire first image data 915, second image data 952, third image data 935, and fourth image data 945 from the camera module 310. Referring to FIG. 9, the first image data 915 may include first pixel data 910, the second image data 925 may include second pixel data 920, the third image data 935 may include third pixel data 930, and the fourth image data 945 may include fourth pixel data 940. In an embodiment, the first pixel data 910, the second pixel data 920, the third pixel data 930, and the fourth pixel data 940 may be pixel data which is acquired through a first pixel 311 (or a second pixel 312, a third pixel 313, a fourth pixel 314) at a first time, a second time, a third time, and a fourth time, respectively.

Referring to FIG. 9, the processor 320 may acquire the first image data to the fourth image data in which the first pixel data 910, the second pixel data 920, the third pixel data 930, and the fourth pixel data 940 have the position relation as shown in FIG. 9. For example, the processor 320 may control the camera module 310 such that the first pixel data 910 and the second pixel data 920 have a pixel gap of 0.5, and the second pixel data 920 and the third pixel data 930 have a pixel gap of 0.5. In an embodiment, the processor 320 may control the camera module 310 such that data acquired from the camera module 310 has the position relation as shown in FIGS. 5 and 6, and may control the camera module 310 such that the data has the position relation as shown in FIG. 9. For example, the position relationship of the first pixel data 910 to the fourth pixel data 940 is one example, and the first pixel data 910 to the fourth pixel data 940 may have various position relations. For example, the first pixel data to the fourth have a relation of pixel data may position $$\begin{pmatrix} \text{first pixel data} & \text{second pixel data} \\ \text{third pixel data} & \text{fourth pixel data} \end{pmatrix},$$

$$\begin{pmatrix} \text{first pixel data} & \text{second pixel data} \\ \text{fourth pixel data} & \text{third pixel data} \end{pmatrix},$$

$$\begin{pmatrix} \text{first pixel data} & \text{fourth pixel data} \\ \text{second pixel data} & \text{third pixel data} \end{pmatrix}, \text{ or}$$

$$\begin{pmatrix} \text{third pixel data} & \text{fourth pixel data} \\ \text{second pixel data} & \text{first pixel data} \end{pmatrix}.$$

In an embodiment, although the processor 320 controls the camera module 310 such that the first pixel data 910, the second pixel data 920, the third pixel data 930, and the fourth pixel data 940 have the position relation as shown in FIG. 9, at least some image areas may not have the position relation illustrated in FIG. 9. For example, the processor 320 may acquire data in which gaps between pixel data are not regular (for example, the position relation of reference numeral 520 of FIG. 5) in at least some areas of the image area.

Referring to FIG. 9, the camera module 310 may acquire the first image data 915 from a time t1 to a time t2. For example, the camera module 310 may read out pixel data from pixels included in some areas of the image sensor 315 at the time t1. The camera module 310 may read out pixel data from pixels included in some other areas of the image sensor 315 between the time t1 and the time t2. In an embodiment, the camera module 310 may read out data at different times in every row of the image sensor 315. For example, referring to the graph of FIG. 9, a time at which the camera module 310 reads out pixels included in a first row of the image sensor 315, and a time at which the camera module 310 reads out pixels included in a second row which is different from the first row may be different from each other. According to an embodiment, the camera module 310 may provide the first image data 915 acquired between the time t1 and the time t2 to the processor 320.

According to an embodiment, the camera module 310 may acquire the second image data 925 from a time t3 to a time t4. According to an embodiment, the camera module 310 may acquire the third image data 935 from a time t5 to a time t6. According to an embodiment, the camera module 310 may acquire the fourth image data 945 from a time t7 to a time t8. In an embodiment, the explanation of acquisition of the first image data 915 may be applied to the second image data 925, the third image data 935, and the fourth image data 945.

According to an embodiment, the processor 320 may read out all pixels from the image sensor 315 at the time t2 and then may control the camera module 310 to perform the OIS function from the time t2 to the time t3. For example, the processor 320 may shift the lens assembly 210 between the time t2 and the time t3 to control the camera module 310 to acquire the second image data 925 including the second pixel data 920 having a different phase from the first pixel data 910. In an embodiment, the processor 320 may control the camera module 310 to perform the OIS function from the time t4 to the time t5 and from the time t6 to the time t5.

According to an embodiment, the processor 320 may continuously acquire the first image data 915, the second image data 925, the third image data 935, and the fourth image data 945 from the camera module 310, and then, may acquire first final pixel data based on the first pixel data 910, the second pixel data 920, the third pixel data 930, and the fourth pixel data 940. For example, the first final pixel data may be understood as meaning the fifth pixel data explained in FIGS. 3 to 7, 8A, and 8B. Pixel data that is referred to as the fifth pixel data in FIGS. 3 to 7, 8A, and 8B may be referred to as the first final pixel data for the convenience of explanation of FIG. 9. In an embodiment, the processor 320 may acquire the first final pixel data through the method explained in relation to FIG. 6. For example, the processor 320 may acquire the first final pixel data by averaging or adding up the first pixel data 910, the second pixel data 920, the third pixel data 930, and the fourth pixel data 940. According to an embodiment, the processor 320 may generate a first image frame based on the first final pixel data.

According to an embodiment, the processor 320 may acquire the fourth image data 945 including the fourth pixel data 940 from the camera module 310, and then, may acquire fifth image data including fifth pixel data having a gap of 0.5 pixel in an upward direction from the fourth pixel data 940. In the description related to FIG. 9, the fifth pixel data may be understood as being separate from the fifth pixel data referred to in FIGS. 3 to 7, 8A, and 8B. In an embodiment, the processor 320 may control the OIS function of the camera module 310 to acquire a plurality of pieces of image data in which a position relation between continuously acquired pixel data changes in the clockwise direction. According to an embodiment, the processor 320 may acquire the fifth image data including the fifth pixel data from the camera module 310, and then, may acquire sixth image data including sixth pixel data having a gap of 0.5 pixel in a rightward direction from the fifth pixel data. According to an embodiment, the processor 320 may acquire the sixth image data from the camera module 310, and then, may continuously acquire seventh image data including seventh pixel data and eighth image data including eighth pixel data. According to an embodiment, the explanation of the position relation among the first pixel data 910, the second pixel data 920, the third pixel data 930, and the fourth pixel data 940 may be applied to a position relation among the fifth pixel data, the sixth pixel data, the seventh pixel data, and the eighth pixel data. According to an embodiment, the processor 320 may continuously acquire the first image data 915, the second image data 925, the third image data 935, the fourth image data 945, the fifth image data, the sixth image data, the seventh image data, and the eighth image data from the camera module 310.

According to an embodiment, the processor 320 may acquire the first image frame based on the first image data 915, the second image data 925, the third image data 935, and the fourth image data 945, and then, may generate a second image frame based on the second image data 925, the third image data 935, the fourth image data 945, and the fifth image data. For example, the processor 320 may acquire second final pixel data based on the second pixel data 920, the third pixel data 930, the fourth pixel data 940, and the fifth pixel data. The processor 320 may generate the second image frame based on the second final pixel data.

According to an embodiment, the processor 320 may generate a third image frame based on the third image data 935, the fourth image data 945, the fifth image data, and the sixth image data. For example, the processor 320 may acquire third final pixel data based on the third pixel data 930, the fourth pixel data 940, the fifth pixel data, and the sixth pixel data. The processor 320 may generate the third image frame based on the third final pixel data.

According to an embodiment, the processor 320 may generate a fourth image frame based on the fourth image data 945, the fifth image data, the sixth image data, and the seventh image data. According to an embodiment, the processor 320 may generate a fifth image frame based on the fifth image data, the sixth image data, the seventh image data, and the eighth image data.

According to an embodiment, four pieces of image data that the processor 320 requires to generate an image frame at a current time may include image data that is used when an image frame is generated at a previous time. For example, the processor 320 may generate the first image frame by acquiring the first image data 915 to the fourth image data 945, and then, may generate an image frame following the first image frame by acquiring the fifth image data to the eighth image data (hereinafter, a first method). Alternatively, the processor 320 may generate the first image frame and then may generate the second image frame by utilizing the second image data 925 to the fourth image data 945 again (hereinafter, a second method). In an embodiment, when the processor 320 uses the image data that is used when the image frame of the previous time is generated in generating the image frame of the current time, there is an advantage that a time interval between the generated image frames is reduced. For example, when an image frame is generated according to the first method, one image frame may be generated every time four pieces of image data are acquired. However, when an image frame is generated in the second method, one image frame may be generated every time one piece of image data is acquired.

According to an embodiment, the processor 320 may acquire an image frame in a different method according to an image-capturing mode. For example, when the processor 320 captures a still image, the processor 320 may acquire the first image data 915, the second image data 925, the third image data 935, and the fourth image data 945 to generate the first image frame. In another example, when the processor 320 makes a video, the processor 320 may generate the second image frame, based on the fifth image data along with the image data (for example, the second image data 925, the third image data 935, the fourth image data 945) that is used when the image frame (for example, the first image frame) of the previous time is generated.

According to an embodiment of the disclosure, an electronic device may include: a camera module configured to perform an OIS function; and at least one processor electrically connected with the camera module. The at least one processor may control the camera module to continuously acquire first image data including first pixel data, second image data including second pixel data, third image data including third pixel data, and fourth image data including fourth pixel data by using the OIS function, may acquire fifth pixel data based on the first pixel data, the second pixel data, the third pixel data, and the fourth pixel data, and may generate a first image frame based on the fifth pixel data.

In the electronic device according to an embodiment, the camera module may include a lens assembly, and the camera module may shift the lens assembly while performing the OIS function, may acquire the first image data, the second image data, the third image data, and the fourth image data through the shifted lens assembly, and may provide the first image data, the second image data, the third image data, and the fourth image data to the at least one processor.

In the electronic device according to an embodiment of the disclosure, the camera module may include an image sensor, and the image sensor may include a first pixel, a second pixel, a third pixel and a fourth pixel which have a 2×2 arrangement.

In the electronic device according to an embodiment of the disclosure, the at least one processor may acquire the fifth pixel data based on the first pixel data, the second pixel data, the third pixel data, and the fourth pixel data which are acquired through the first pixel.

In the electronic device according to an embodiment of the disclosure, the at least one processor may acquire the fifth pixel data based on the first pixel data and the third pixel data which are acquired through the second pixel, and the second pixel data and the fourth pixel data which are acquired through the first pixel.

In the electronic device according to an embodiment of the disclosure, the at least one processor may acquire the fifth pixel data based on the fourth pixel data which is acquired through the first pixel, the third pixel data which is acquired through the second pixel, the second pixel data which is acquired through the third pixel, and the first pixel data which is acquired through the fourth pixel.

In the electronic device according to an embodiment of the disclosure, the at least one processor may acquire the fifth pixel data by averaging the first pixel data, the second pixel data, the third pixel data, and the fourth pixel data.

In the electronic device according to an embodiment of the disclosure, the at least one processor may acquire the fifth pixel data by adding up the first pixel data, the second pixel data, the third pixel data, and the fourth pixel data.

According to an embodiment of the disclosure, an operating method of an electronic device may include: controlling a camera module included in the electronic device to continuously acquire first image data including first pixel data, second image data including second pixel data, third image data including third pixel data, and fourth image data including fourth pixel data by using an OIS function; acquiring fifth pixel data based on the first pixel data, the second pixel data, the third pixel data, and the fourth pixel data; and generating a first image frame based on the fifth pixel data.

In the operating method of the electronic device according to an embodiment of the disclosure, controlling the camera module to acquire the first image data, the second image data, the third image data, and the fourth image data may include: shifting a lens assembly included in the camera module while performing the OIS function; and acquiring the first image data, the second image data, the third image data, and the fourth image data through the shifted lens assembly.

In the operating method of the electronic device according to an embodiment of the disclosure, acquiring the fifth pixel data may include acquiring the fifth pixel data based on the first pixel data, the second pixel data, the third pixel data, and the fourth pixel data which are acquired through a first pixel included in an image sensor.

In the operating method of the electronic device according to an embodiment of the disclosure, an image sensor of the camera module may include a first pixel and a second pixel which is adjacent to the first pixel, and acquiring the fifth pixel data may include acquiring the fifth pixel data based on the first pixel data and the third pixel data which are acquired through the second pixel, and the second pixel data and the fourth pixel data which are acquired through the first pixel.

In the operating method of the electronic device according to an embodiment of the disclosure, an image sensor of the camera module may include a first pixel, a second pixel, a third pixel and a fourth pixel which have a 2×2 arrangement, and acquiring the fifth pixel data may include acquiring the fifth pixel data based on the fourth pixel data which is acquired through the first pixel, the third pixel data which is acquired through the second pixel, the second pixel data which is acquired through the third pixel, and the first pixel data which is acquired through the fourth pixel.

In the operating method of the electronic device according to an embodiment of the disclosure, acquiring the fifth pixel data may include averaging the first pixel data, the second pixel data, the third pixel data, and the fourth pixel data.

In the operating method of the electronic device according to an embodiment of the disclosure, acquiring the fifth pixel data may include adding up the first pixel data, the second pixel data, the third pixel data, and the fourth pixel data.

According to an embodiment of the disclosure, an electronic device may include a camera module configured to perform an OIS function, and at least one processor electrically connected with the camera module. The at least one processor may control the camera module to continuously acquire $N^2$ pieces of image data by using the OIS function, may acquire final pixel data based on the $N^2$ pieces of pixel data, and may generate a first image frame based on the final pixel data. Herein, the $N^2$ pieces of image data may include $N^2$ pieces of pixel data corresponding to image data, respectively, and the N may be a natural number greater than or equal to 2.

In the electronic device according to an embodiment of the disclosure, the $N^2$ pieces of image data may include first image data, second image data, third image data, and fourth image data, the $N^2$ pieces of pixel data may include first pixel data, second pixel data, third pixel data, and fourth pixel data, and the final pixel data may be first final pixel data, and the at least one processor may acquire fifth image data following the fourth image data from the camera module by using the OIS function, may acquire second final pixel data based on the second pixel data, the third pixel data, the fourth pixel data, and the fifth pixel data, and may generate a second image frame based on the second final pixel data. Herein, the fifth image data may include fifth pixel data.

In the electronic device according to an embodiment of the disclosure, the at least one processor may acquire sixth image data following the fifth image data from the camera module by using the OIS function, may acquire third final pixel data based on the third pixel data, the fourth pixel data, the fifth pixel data, and the sixth pixel data, and may generate a third image frame based on the third final pixel data. Herein, the sixth image data may include sixth pixel data.

In the electronic device according to an embodiment of the disclosure, the at least one processor may acquire the first final pixel data by averaging the first pixel data, the second pixel data, the third pixel data, and the third pixel data, and may acquire the second final pixel data by averaging the second pixel data, the third pixel data, the fourth pixel data, and the fifth pixel data.

In the electronic device according to an embodiment of the disclosure, the at least one processor may generate the second image frame based on the second pixel data, the third pixel data, the fourth pixel data, and the fifth pixel data in a moving image capturing mode.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a camera module configured to perform an optical image stabilization (OIS) function;
    memory, comprising one or more storage media, storing instructions; and
    at least one processor communicatively coupled to the memory and the camera module,
    wherein the instructions, when executed by the at least one processor individually or collectively, cause the electronic device to:
        control the camera module to continuously acquire first image data including first pixel data, second image data including second pixel data, third image data including third pixel data, and fourth image data including fourth pixel data by using the OIS function, wherein the first image data, the second image data, the third image data, and the fourth image data have different phases from each other due to the OIS function,
        acquire a plurality of fifth pixel data based on a center of mass calculation of the first pixel data, the second pixel data, the third pixel data, and the fourth pixel data, and
        generate a first image frame based on the plurality of fifth pixel data,
        wherein an interval between pixels of the plurality of fifth pixel data is adjusted to be narrower than an interval between pixels of first image data,
        wherein the different phases of the first image data, the second image data, the third image data, and the fourth image data result in different positions of a corresponding pixel in each of the first image data, the second image data, the third image data, and the fourth image data, and
        wherein a center of mass of the corresponding pixels is not positioned an equal distance from each of the first image data, the second image data, the third image data, and the fourth image data.

2. The electronic device of claim 1,
    wherein the camera module comprises a lens assembly, and
    wherein the camera module is further configured to:
        shift the lens assembly while performing the OIS function,
        acquire the first image data, the second image data, the third image data, and the fourth image data through the shifted lens assembly, and
        provide the first image data, the second image data, the third image data, and the fourth image data to the at least one processor.

3. The electronic device of claim 1,
    wherein the camera module comprises an image sensor, and
    wherein the image sensor comprises a first pixel, a second pixel, a third pixel and a fourth pixel which have a 2×2 arrangement.

4. The electronic device of claim 3, wherein the instructions, when executed by the at least one processor individually or collectively, further cause the electronic device to acquire the fifth pixel data based on the first pixel data, the second pixel data, the third pixel data, and the fourth pixel data which are acquired through the first pixel.

5. The electronic device of claim 3, wherein the instructions, when executed by the at least one processor individually or collectively, further cause the electronic device to acquire the fifth pixel data based on the first pixel data and the third pixel data which are acquired through the second pixel, and the second pixel data and the fourth pixel data which are acquired through the first pixel.

6. The electronic device of claim 3, wherein the instructions, when executed by the at least one processor individually or collectively, further cause the electronic device to acquire the fifth pixel data based on the fourth pixel data which is acquired through the first pixel, the third pixel data which is acquired through the second pixel, the second pixel data which is acquired through the third pixel, and the first pixel data which is acquired through the fourth pixel.

7. The electronic device of claim 1, wherein the instructions, when executed by the at least one processor individually or collectively, further cause the electronic device to acquire the fifth pixel data by averaging the first pixel data, the second pixel data, the third pixel data, and the fourth pixel data.

8. The electronic device of claim 1, wherein the instructions, when executed by the at least one processor individually or collectively, further cause the electronic device to acquire the fifth pixel data by adding up the first pixel data, the second pixel data, the third pixel data, and the fourth pixel data.

9. An operating method of an electronic device, the operating method comprising:
    controlling a camera module included in the electronic device to continuously acquire first image data including first pixel data, second image data including second pixel data, third image data including third pixel data, and fourth image data including fourth pixel data by using an optical image stabilization (OIS) function, wherein the first image data to the fourth image data have different phases from each other due to the OIS function;
    acquiring a plurality of fifth pixel data based on a center of mass calculation of the first pixel data, the second pixel data, the third pixel data, and the fourth pixel data; and
    generating a first image frame based on the plurality of fifth pixel data,
    wherein an interval between pixels of the plurality of fifth pixel data is adjusted to be narrower than an interval between pixels of first image data,
    wherein the different phases of the first image data, the second image data, the third image data, and the fourth image data result in different positions of a corresponding pixel in each of the first image data, the second image data, the third image data, and the fourth image data, and wherein a center of mass of the corresponding pixels is not positioned an equal distance from each of the first image data, the second image data, the third image data, and the fourth image data.

10. The method of claim 9, wherein the controlling of the camera module to acquire the first image data, the second image data, the third image data, and the fourth image data comprises:

shifting a lens assembly included in the camera module while performing the OIS function; and acquiring the first image data, the second image data, the third image data, and the fourth image data through the shifted lens assembly.

11. The method of claim 9, wherein the acquiring of the fifth pixel data comprises acquiring the fifth pixel data based on the first pixel data, the second pixel data, the third pixel data, and the fourth pixel data which are acquired through a first pixel included in an image sensor.

12. The method of claim 9, wherein an image sensor of the camera module comprises a first pixel and a second pixel which is adjacent to the first pixel, and wherein the acquiring of the fifth pixel data comprises acquiring the fifth pixel data based on the first pixel data and the third pixel data which are acquired through the second pixel, and the second pixel data and the fourth pixel data which are acquired through the first pixel.

13. The method of claim 9, wherein an image sensor of the camera module comprises a first pixel, a second pixel, a third pixel and a fourth pixel which have a 2×2 arrangement, and wherein the acquiring of the fifth pixel data comprises acquiring the fifth pixel data based on the fourth pixel data which is acquired through the first pixel, the third pixel data which is acquired through the second pixel, the second pixel data which is acquired through the third pixel, and the first pixel data which is acquired through the fourth pixel.

14. The method of claim 9, wherein the acquiring of the fifth pixel data comprises averaging the first pixel data, the second pixel data, the third pixel data, and the fourth pixel data.

15. The method of claim 9, wherein the acquiring of the fifth pixel data comprises adding up the first pixel data, the second pixel data, the third pixel data, and the fourth pixel data.

16. An electronic device comprising:

a camera module configured to perform an optical image stabilization (OIS) function;

memory, comprising one or more storage media, storing instructions; and at least one processor electrically connected with communicatively coupled to the memory and the camera module, wherein the instructions, when executed by the at least one processor is configured individually or collectively, cause the electronic device to:

control the camera module to continuously acquire $N^2$ pieces of image data by using the OIS function, wherein each of the $N^2$ pieces of image data have different phases from each other due to the OIS function;

acquire a plurality of final pixel data based on a center of mass calculation of the $N^2$ pieces of pixel data; and generate a first image frame based on the plurality of final pixel data, wherein the $N^2$ pieces of image data may include $N^2$ pieces of pixel data corresponding to image data, respectively, and the N may be a natural number greater than or equal to 2, wherein an interval between pixels of the plurality of final pixel data is adjusted to be narrower than an interval between pixels of any piece of the $N^2$ pieces of image data wherein the different phases of the $N^2$ pieces of image data result in different positions of a corresponding pixel in each of the $N^2$ pieces of image data, and wherein a center of mass of the corresponding pixels is not positioned an equal distance from each of the $N^2$ pieces of image data.

17. The electronic device of claim 16, wherein the $N^2$ pieces of image data comprises first image data, second image data, third image data, and fourth image data, wherein the $N^2$ pieces of pixel data includes first pixel data, second pixel data, third pixel data, and fourth pixel data, wherein the final pixel data may be first final pixel data, wherein the at least one processor is further configured to:

acquire fifth image data including fifth pixel data following the fourth image data from the camera module by using the OIS function; and acquire second final pixel data based on the second pixel data, the third pixel data, the fourth pixel data, and the fifth pixel data, and may generate a second image frame based on the second final pixel data, wherein the fifth image data may include fifth pixel data.

18. The electronic device of claim 17, wherein the at least one processor is further configured to:

acquire sixth image data including sixth pixel data following the fifth image data from the camera module by using the OIS function; and acquire third final pixel data based on the third pixel data, the fourth pixel data, the fifth pixel data, and the sixth pixel data, and may generate a third image frame based on the third final pixel data, wherein the sixth image data may include sixth pixel data.

19. The electronic device of claim 17, wherein the at least one processor is further configured to:

acquire the first final pixel data by averaging the first pixel data, the second pixel data, the third pixel data, and the third pixel data; and acquire the second final pixel data by averaging the second pixel data, the third pixel data, the fourth pixel data, and the fifth pixel data.

20. The electronic device of claim 17, wherein the at least one processor is further configured to:

generate the second image frame based on the second pixel data, the third pixel data, the fourth pixel data, and the fifth pixel data in a moving image capturing mode.

* * * * *